(12) United States Patent
Wolf et al.

(10) Patent No.: US 8,577,718 B2
(45) Date of Patent: Nov. 5, 2013

(54) METHODS AND SYSTEMS FOR IDENTIFYING, QUANTIFYING, ANALYZING, AND OPTIMIZING THE LEVEL OF ENGAGEMENT OF COMPONENTS WITHIN A DEFINED ECOSYSTEM OR CONTEXT

(75) Inventors: Warren L. Wolf, Austin, TX (US); Manu Rehani, Portland, OR (US)

(73) Assignee: DW Associates, LLC, Austin, TX (US)

( * ) Notice: Subject to any disclaimer, the term of this patent is extended or adjusted under 35 U.S.C. 154(b) by 0 days.

(21) Appl. No.: 13/284,635

(22) Filed: Oct. 28, 2011

(65) Prior Publication Data
US 2012/0116852 A1 May 10, 2012

Related U.S. Application Data

(60) Provisional application No. 61/410,208, filed on Nov. 4, 2010.

(51) Int. Cl.
*G06Q 10/00* (2012.01)

(52) U.S. Cl.
USPC ........................................ 705/7.41; 705/7.38

(58) Field of Classification Search
USPC .............................................. 705/7.38, 7.41
See application file for complete search history.

(56) References Cited

U.S. PATENT DOCUMENTS

| | | | |
|---|---|---|---|
| 5,128,865 A | 7/1992 | Sadler | |
| 5,249,967 A | 10/1993 | O'Leary et al. | |
| 5,454,722 A | 10/1995 | Holland et al. | |
| 5,533,181 A | 7/1996 | Bergsneider | |
| 5,781,879 A | 7/1998 | Arnold et al. | |
| 5,797,123 A | 8/1998 | Chou et al. | |
| 5,857,855 A | 1/1999 | Katayama | |
| 5,887,120 A | 3/1999 | Wical | |
| 5,961,333 A | 10/1999 | Harrison et al. | |
| 6,126,449 A | 10/2000 | Burns | |

(Continued)

FOREIGN PATENT DOCUMENTS

| | | |
|---|---|---|
| JP | 2002149675 | 5/2004 |
| JP | 2004157931 | 6/2004 |
| WO | 2012000013 | 1/2012 |

OTHER PUBLICATIONS

Richards, David. Hellmann HR team instills values and behaviors. Strategic HR Review; 2008; 7, 4.*

(Continued)

*Primary Examiner* — Johnna Loftis
(74) *Attorney, Agent, or Firm* — Marger Johnson & McCollom PC

(57) ABSTRACT

A method and system for optimizing the level of engagement of components within a defined ecosystem or context includes defining an initial ecosystem or context 'A' in structural, functional, operational, and conceptual terms. One or more components are identified in the defined ecosystem or context 'A'. It is determined whether all identified components account for all of the structural, functional, operational, and conceptual terms of the initial ecosystem or context 'A'. If so, levels of disengagement and engagement are quantified for each of the identified components. For each of the identified components, one or more gaps are measured between a current component engagement level and a potential component engagement level. A report associated with the one or more identified components and the one or more measured gaps is produced and output. The report includes an organizational structure of the one or more components within a new ecosystem or context 'B'.

34 Claims, 6 Drawing Sheets

(56) References Cited

U.S. PATENT DOCUMENTS

| | | | |
|---|---|---|---|
| 6,138,085 A | 10/2000 | Richardson et al. | |
| 6,173,261 B1 | 1/2001 | Arai et al. | |
| 6,385,620 B1 | 5/2002 | Kurzius et al. | |
| 6,453,315 B1 | 9/2002 | Weissman et al. | |
| 6,504,990 B1 | 1/2003 | Abecassis | |
| 6,523,026 B1 | 2/2003 | Gillis | |
| 6,556,964 B2 | 4/2003 | Haug et al. | |
| 6,684,202 B1 | 1/2004 | Humphrey et al. | |
| 7,403,890 B2 | 7/2008 | Roushar | |
| 7,487,094 B1 | 2/2009 | Konig et al. | |
| 7,539,697 B1 | 5/2009 | Akella et al. | |
| 7,555,441 B2 | 6/2009 | Crow et al. | |
| 7,565,403 B2 | 7/2009 | Horvitz et al. | |
| 7,567,895 B2 | 7/2009 | Chen et al. | |
| 7,607,083 B2 | 10/2009 | Gong et al. | |
| 7,644,144 B1 | 1/2010 | Horvitz et al. | |
| 7,711,573 B1 | 5/2010 | Obeid | |
| 7,711,672 B2 | 5/2010 | Au | |
| 7,720,675 B2 | 5/2010 | Burstein et al. | |
| 7,792,685 B2 | 9/2010 | Andino, Jr. et al. | |
| 7,813,917 B2 | 10/2010 | Shuster | |
| 7,870,203 B2 | 1/2011 | Judge et al. | |
| 7,917,587 B2 | 3/2011 | Zeng et al. | |
| 7,966,265 B2 | 6/2011 | Schalk et al. | |
| 8,090,725 B1 | 1/2012 | Cranfill | |
| 2002/0059376 A1 | 5/2002 | Schwartz | |
| 2002/0099730 A1 | 7/2002 | Brown et al. | |
| 2002/0106622 A1 | 8/2002 | Osborne et al. | |
| 2003/0027121 A1 | 2/2003 | Grudnitski et al. | |
| 2003/0028564 A1 | 2/2003 | Sanfilippo | |
| 2003/0093322 A1 | 5/2003 | Sciuk | |
| 2003/0167266 A1 | 9/2003 | Saldanha et al. | |
| 2003/0182310 A1 | 9/2003 | Charnock et al. | |
| 2004/0030556 A1 | 2/2004 | Bennett | |
| 2004/0053203 A1 | 3/2004 | Walters et al. | |
| 2004/0117234 A1 | 6/2004 | Lindsay-Scott et al. | |
| 2005/0055209 A1 | 3/2005 | Epstein | |
| 2005/0165600 A1 | 7/2005 | Kasravi et al. | |
| 2005/0192949 A1 | 9/2005 | Kojima | |
| 2005/0197890 A1 | 9/2005 | Lu et al. | |
| 2005/0202871 A1 | 9/2005 | Lippincott | |
| 2005/0204337 A1 | 9/2005 | Diesel et al. | |
| 2005/0262428 A1 | 11/2005 | Little et al. | |
| 2005/0272517 A1 | 12/2005 | Funk et al. | |
| 2005/0282141 A1 | 12/2005 | Falash et al. | |
| 2006/0206332 A1 | 9/2006 | Paek et al. | |
| 2006/0230102 A1 | 10/2006 | Hidary | |
| 2006/0235843 A1 | 10/2006 | Musgrove et al. | |
| 2006/0246973 A1 | 11/2006 | Thomas et al. | |
| 2007/0061179 A1 | 3/2007 | Henderson et al. | |
| 2007/0112710 A1 | 5/2007 | Drane et al. | |
| 2007/0135225 A1 | 6/2007 | Nieminen et al. | |
| 2007/0196798 A1 | 8/2007 | Pryor et al. | |
| 2007/0203991 A1 | 8/2007 | Fisher et al. | |
| 2007/0213126 A1 | 9/2007 | Deutsch et al. | |
| 2007/0259324 A1 | 11/2007 | Frank | |
| 2007/0260421 A1 | 11/2007 | Berner et al. | |
| 2007/0265089 A1 | 11/2007 | Robarts et al. | |
| 2008/0052283 A1 | 2/2008 | Jensen et al. | |
| 2008/0191864 A1 | 8/2008 | Wolfson | |
| 2008/0281620 A1 | 11/2008 | Schalk et al. | |
| 2008/0300930 A1* | 12/2008 | Compitello et al. | 705/7 |
| 2009/0006164 A1 | 1/2009 | Kaiser et al. | |
| 2009/0024554 A1 | 1/2009 | Murdock et al. | |
| 2009/0024747 A1 | 1/2009 | Moses et al. | |
| 2009/0035736 A1 | 2/2009 | Wolpert et al. | |
| 2009/0198488 A1 | 8/2009 | Vigen | |
| 2009/0248399 A1 | 10/2009 | Au | |
| 2009/0282104 A1 | 11/2009 | O'Sullivan et al. | |
| 2009/0287672 A1* | 11/2009 | Chakrabarti et al. | 707/5 |
| 2009/0292541 A1 | 11/2009 | Daya et al. | |
| 2009/0319508 A1 | 12/2009 | Yih et al. | |
| 2010/0023377 A1 | 1/2010 | Sheridan | |
| 2010/0098289 A1 | 4/2010 | Tognoli | |
| 2010/0145678 A1 | 6/2010 | Csomai et al. | |
| 2010/0179916 A1 | 7/2010 | Johns et al. | |
| 2010/0228733 A1 | 9/2010 | Harrison et al. | |
| 2010/0274636 A1* | 10/2010 | Sheridan | 705/10 |
| 2010/0306251 A1 | 12/2010 | Snell | |
| 2011/0040837 A1 | 2/2011 | Eden et al. | |
| 2011/0055098 A1 | 3/2011 | Stewart | |
| 2011/0184939 A1 | 7/2011 | Elliott | |
| 2011/0208511 A1 | 8/2011 | Sikstrom et al. | |
| 2011/0258049 A1* | 10/2011 | Ramer et al. | 705/14.66 |
| 2011/0295759 A1 | 12/2011 | Selvakummar et al. | |

OTHER PUBLICATIONS

Parkes, Louise P; Langford, Peter H. A test of the importance of work-life balance for employee engagement and intention to stay in organisations. Journal of Management and Organization. vol. 14, Issue 3, Jul. 2008.*

McBain, Richard. The practice of engagement. Strategic HR Review; Sep./Oct. 2007; 6; 6.*

Hyuna, Choi. Managing Talent Through Employee Engagement. SERI Quarterly. Jul. 2008.*

Employee Engagement What's Your Engagement Ratio? Gallup Consulting. 2008.*

Schaufeli, Wilmar B.; Bakker, Arnold B.; Salanova, Marisa. The Measurement of Work Engagement With a Short Questionnaire. A Cross-National Study. Educational and Psychological Measurement. vol. 66, No. 4. Aug. 2006.*

Performance Optimization Framework Value Proposition. Introcution and Overview. Knowledge Advisors. Copyright 2009.*

Kular, Sandeep; Gatenby, Mark; Rees, Chris; Soane, Emma; Truss, Katie. Employee Engagement: A Literature Review. Kingston University, Kingston Business School. Working Paper Series No. 19. Oct. 2008.*

Office Action dated May 5, 2009, U.S. Appl. No. 11/419,324, filed May 19, 2006 entitled "System and Method for Authoring and Learning".

Van Rijk, R et al., Using CrisisKit and MOPED to Improve Emergency Management Team Training, Proceedings ISCRAM 2004, Brussels, May 3-4, 2004. pp. 161-166.

Thomas, P.G. et al., AESOP—An Electronic Student Observatory Project, Frontiers in Education, 1998, 5 pages.

Loftin, R.B. et al., Training the Hubble Space Telescope Flight Team, IEEE Computer Graphics and Applications, 1995, pp. 31-37.

Office Action dated Jun. 16, 2008, U.S. Appl. No. 11/419,317, filed May 19, 2006 entitled "Method for Interactive Training and Learning."

Office Action dated Oct. 31, 2008, U.S. Appl. No. 11/419,317, filed May 19, 2006 entitled "Method for Interactive Training and Learning."

Office Action dated Jun. 16, 2009 U.S. Appl. No. 11/419,317, filed May 19, 2006 entitled "Method for Interactive Training and Learning."

Office Action dated Nov. 17, 2009 U.S. Appl. No. 11/419,317, filed May 19, 2006 entitled "Method for Interactive Training and Learning."

Aiolli, Fabio; Sebastiani, Fabrizio; Sperduti, Alessandro, Preference Learning for Category-Ranking Based Interactive Text Caegeorization, Proceedings of International Joint Conference on Neural Networks, ICJNN 2007, Orlando, FL, Aug. 12-17, 2007, pp. 2034-2039.

Mood Indicator Based on History of Electronic Communication Thread, IPCOM, Disclosure No. IPCOM000198194D, Jul. 29, 2010, 3 pages, retrieved from http://ip.com/IPCOM/000198194.

Keh, Huan-Chao, The Chinese Text Categorization System with Category Priorities, Journal of Software, Oct. 2010, vol. 5, No. 10, pp. 1137-1143.

R. Hawkins and M. Russell, Document Categorization Using Lexical Analysis and Fuzzy Sets, IBM Technical Disclosure Bulletin, Jun. 1992, vol. 35, No. 1A, 1 pg.

(56) References Cited

OTHER PUBLICATIONS

Lingway Vertical Search Solutions, Lingway HR Suite, "Lingway e-Recruitment Applications: a Semantic Solution for Recruitment", retrieved from http://www.lingway.com/images/pdf/fichelhrslea07anglaisweb.pdf on Jun. 17, 2012 (2 pages).

Tseng, "Semantic Classification of Chinese unknown words", ACL '03 Proceedings of the 41st Annual Meeting on Association for Computational Linguistics—vol. 2 Association for Computational Linguistics Stroudsburg, PA, USA © 2003.

Mohammad, "Measuring Semantic Distance Using Distributional Profiles of Concepts", a thesis submitted in conformity with the requirements for the degree of Graduate Department of Computer Science University of Toronto, 2008, pp. 1-167.

Mohammad, et al., "Measuring Semantic Distance Using Distributional Profiles of Concepts", Association for Computational Linguistics; retrieved at http://www.umiacs.umd.edu/~saif/WebDocs/Measuring-Semantic-Distance.pdf, 2006, pp. 1-34.

* cited by examiner

METHODS AND SYSTEMS FOR IDENTIFYING, QUANTIFYING, ANALYZING, AND OPTIMIZING THE LEVEL OF ENGAGEMENT OF COMPONENTS WITHIN A DEFINED ECOSYSTEM OR CONTEXT

CROSS REFERENCE TO RELATED APPLICATIONS

This application claims the benefit of U.S. Provisional Patent Application Ser. No. 61/410,208, filed Nov. 4, 2010, incorporated by reference herein.

BACKGROUND

Business enterprises struggle with various challenges involving the development and application of management methods, models, and theories. To maximize shareholder value in a corporation, for example, factors such as quality in a manufacturing system, work flows, component output, and so forth, can directly impact the output capacity, which in turn can influence the valuation of the corporation.

One well-known example of managing quality is the Total Quality Management (TQM) approach, which is used in the development of organization systems for business processes. This approach aims to reduce errors produced during either manufacturing or service-based enterprises to thereby increase the total output. Another well-known example is the Six Sigma approach. In general, Six Sigma attempts to improve quality in a particular environment by reducing the number of defects, while TQM attempts to improve quality in a particular environment by promoting conformance to internal requirements. Other approaches focus on managing workflow, such as by running an assembly or manufacturing line at the rate or beat of the slowest cog.

Prior attempts to optimize the level of engagement of components within a defined context are inadequate because the approach to quantify level of engagement is indirect and based on evaluating actions or time that are assumed to be indicators of engagement and not necessarily based on the processes involved in engagement.

Accordingly, a need remains for improved methods and systems for identifying, quantifying, analyzing, and optimizing the level of engagement of components within a defined context using techniques of relationship analysis. Embodiments of the invention address these and other limitations in the prior art.

Figure 1:
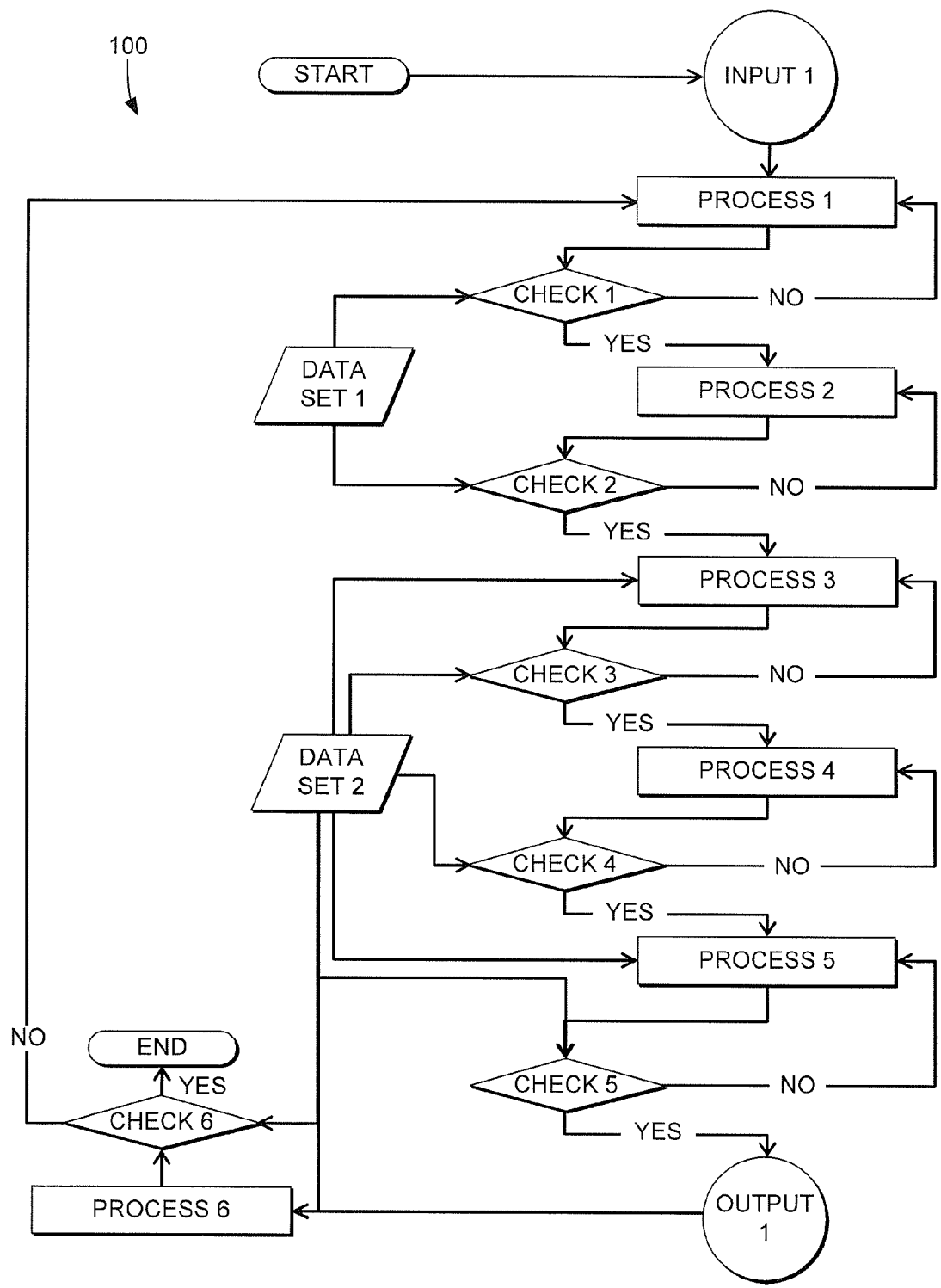
FIG. 1 is a flow diagram illustrating a technique for identifying and quantifying components within one or more contexts, according to embodiments of the invention.

The foregoing and other features of the invention will become more readily apparent from the following detailed description, which proceeds with reference to the accompanying drawings.

DETAILED DESCRIPTION

Reference will now be made in detail to embodiments of the invention, examples of which are illustrated in the accompanying drawings. In the following detailed description, numerous specific details are set forth to enable a thorough understanding of the present invention. It should be understood, however, that persons having ordinary skill in the art may practice the present invention without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first component could be termed a second component, and, similarly, a second component could be termed a first component, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention include methods and systems for using techniques of relationship analysis to optimize the level of engagement of components within a defined ecosystem or context to improve the potential for desired outcome, such as a higher level of quality, in which the desired outcome is coherent with the defined ecosystem or context.

Inventive principles disclosed herein are based, for example, on the following: a) engagement of components is a function of the relationship between specific components, b) engagement of components is also a function of the relationship among all perceived components in an ecosystem or context, c) the qualities of the relationships between and among components are qualities of the interface through which the components interact with each other, d) the structure of this interface, which can also be called perception, through which components interact is what defines whether the engagement is coherent or incoherent, and/or e) the structure of this interface or perception can be constructed for coherent or incoherent engagement.

The method and/or system can identify the perceived components in an ecosystem or context, gauge the current level of engagement of the components, constantly or periodically check against the current and potential assessment of the defined context, analyze the gaps in component engagement levels, transform and restructure the interface between the components and check for desired outcome and improvements. The technique can be recursive in nature and can loop at each step until the feedback is coherent with current and potential assessment of the defined ecosystem or context. The technique can also be recursive at the macro level in that the restructured ecosystem or context itself can be considered as a perceived component in a larger defined ecosystem or context.

Figure 2:
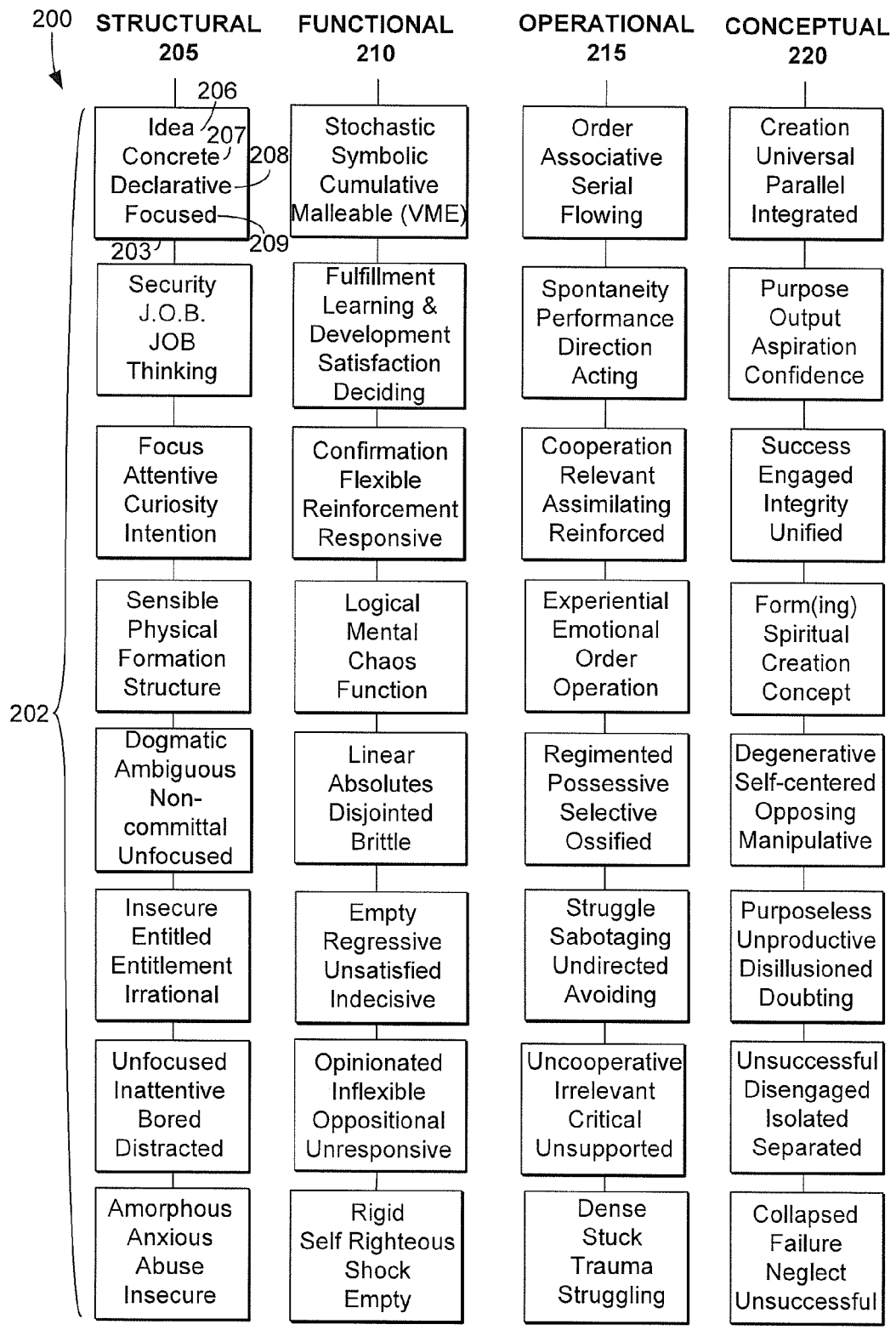
FIG. 2 is a diagram of a context definition meta-structure according to embodiments of the invention.
Figure 3A:
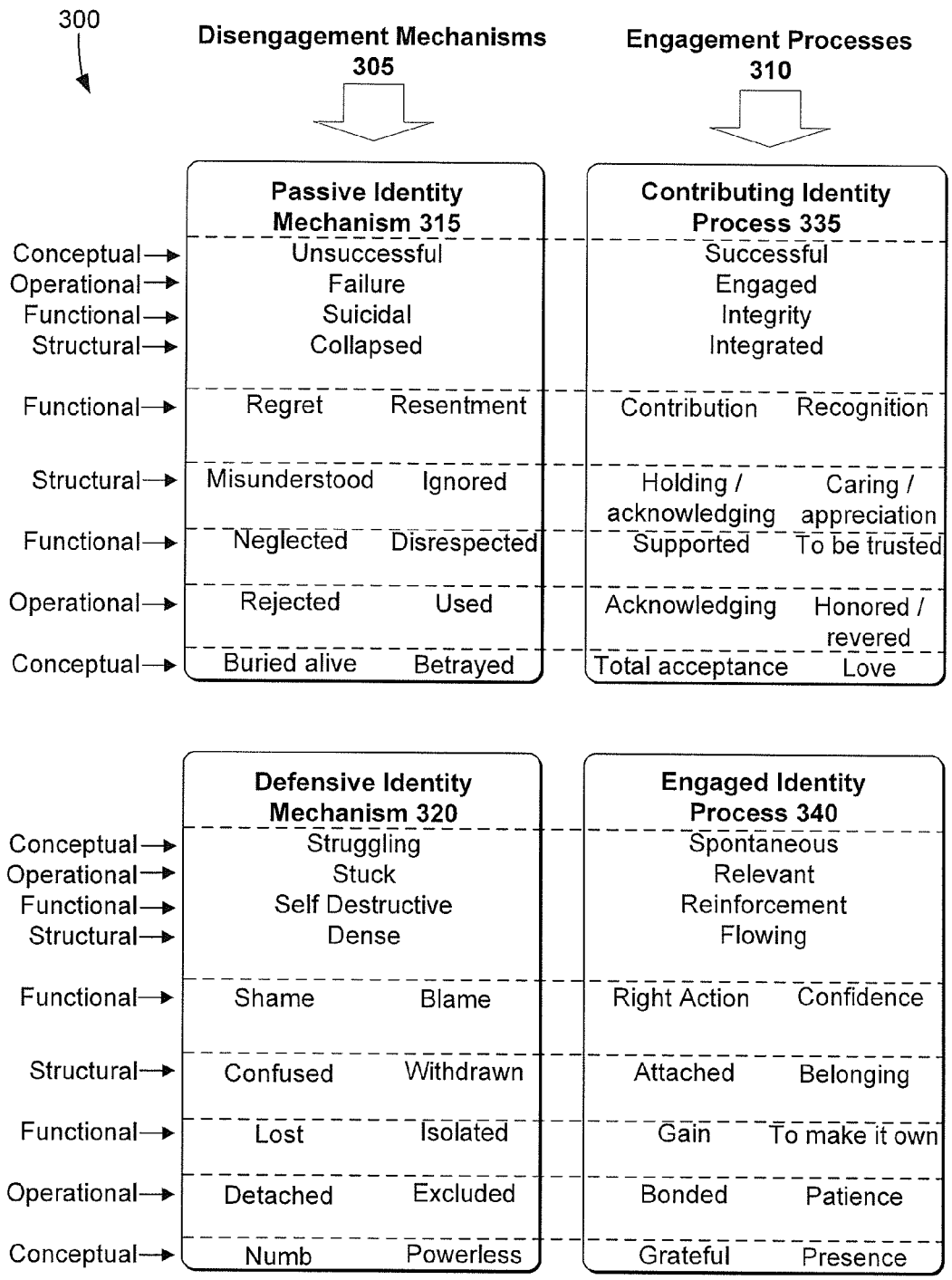
FIGS. 3A and 3B illustrate a diagram of a disengagement and engagement quantification meta-structure according to embodiments of the invention.
Figure 3B:
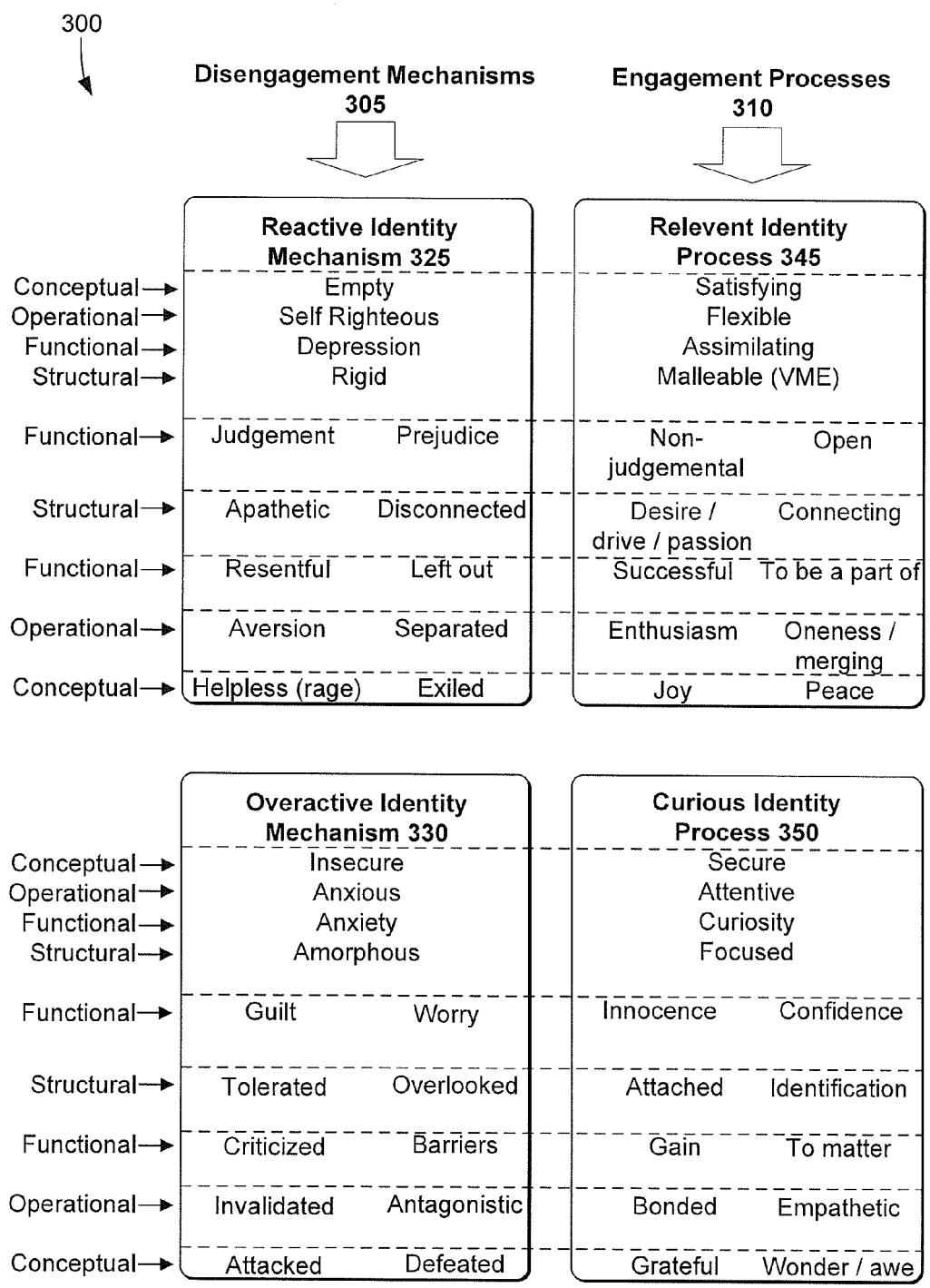
Figure 4:
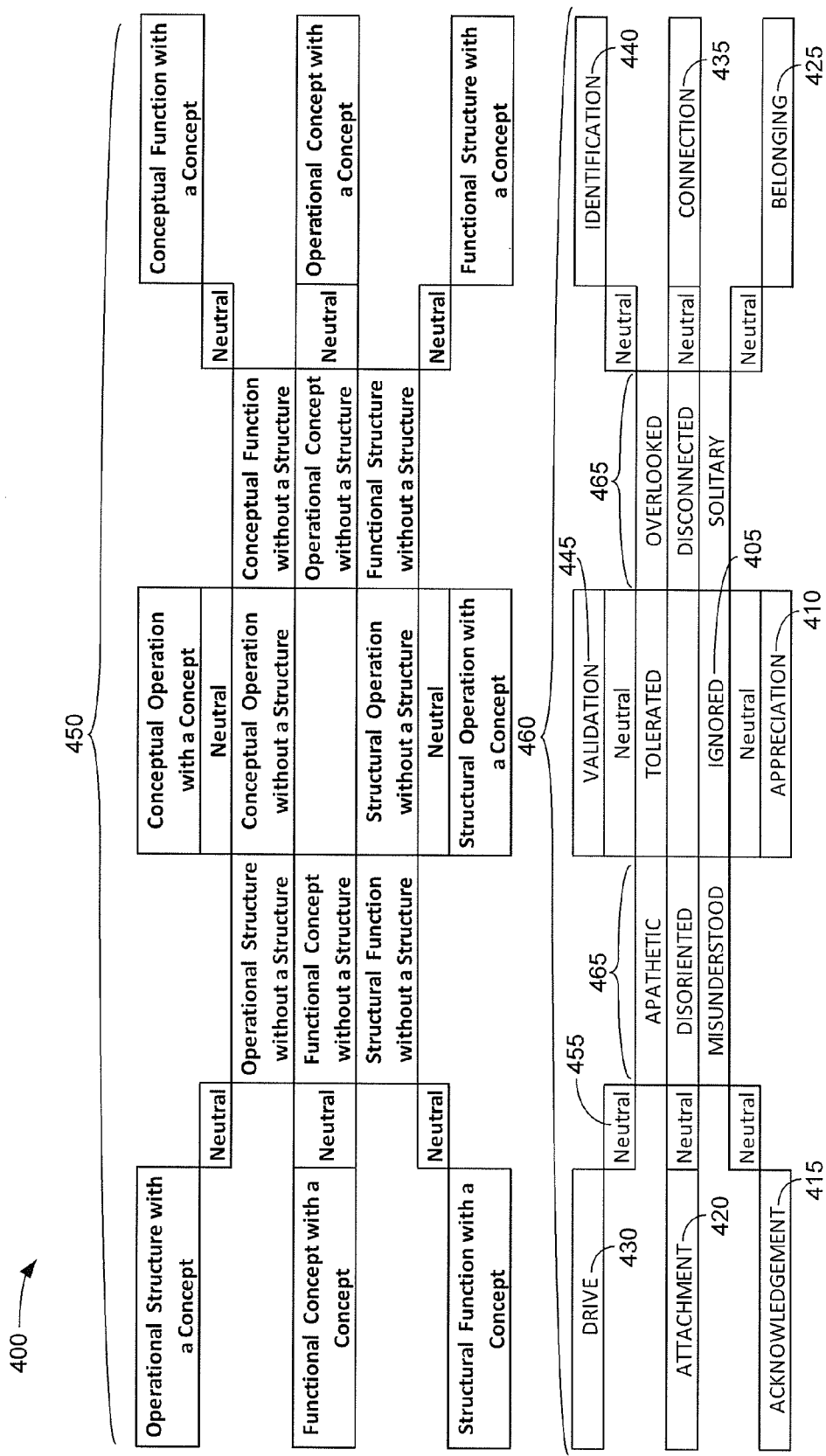
FIG. 4 is a diagram of a component interface definition meta-structure map according to embodiments of the invention.

FIG. 1 is a flow diagram 100 illustrating a technique for identifying and quantifying components within one or more contexts. FIG. 2 is a block diagram of a context definition meta-structure 200 according to embodiments of the invention. FIGS. 3A and 3B illustrate a diagram of a disengagement and engagement quantification meta-structure 300 according to embodiments of the invention. FIG. 4 is a diagram of a component interface definition meta-structure map 400 according to embodiments of the invention. Reference is now made to FIGS. 1 through 4.

The process flow begins at the START and proceeds to INPUT 1 in which an initial ecosystem or context 'A' is defined. The initial ecosystem or context 'A' can be defined in structural 205, functional 210, operational 215, and/or conceptual 220 terms, as set forth in the context definition meta-structure 200 of FIG. 2.

For example, the initial ecosystem or context 'A' may be specifically defined as a product development group that has a certain organizational structure, in which members have functional responsibilities and capabilities which they apply towards their operations directed at new product development, which is the conceptual construct of why they exist as a group. In this example, the organizational structure can be defined by the structural 205 terms of the context definition meta-structure 200, the responsibilities and capabilities of the members can be defined by the functional 210 terms of the context definition meta-structure 200, the new product development can be defined by the operational 215 terms of the context definition meta-structure 200, and the reasons associated with the existence of the group can be defined by the conceptual 220 terms of the context definition meta-structure 200.

Input data for any stage may be collected by means of automated tallying, ranking, and accounting systems for information that is already quantified. For example, productivity records, machine uptime and down time data, work time reports, efficiency assessments, and so forth, may be used as input in helping to define the initial ecosystem or context 'A'. Moreover, surveys and interviews to translate subjective data into quantifiable data, can be gathered and used as input at any stage disclosed herein. Such input can be part of INPUT 1, or otherwise used at different input intervals at any process and/or check stage disclosed herein.

Each of the structural 205, functional 210, operational 215, and conceptual 220 terms of the context definition meta-structure 200 can be organized into definitional groups (e.g., 202). One or more definitional terms can be associated with each definitional group. For example, the structural terms 205 are organized into definitional groups 202 including group 203 in which each definitional group includes four definitional terms. In the case of group 203, the definitional terms are Idea 206, Concrete 207, Declarative 208, and Focused 209. The initial ecosystem or context 'A' can be defined using one or more definitional groups set forth in the meta-structure 200, or alternatively, using one or more individual definitional terms set forth in the meta-structure 200.

The flow proceeds to PROCESS 1 in which one or more components in the defined ecosystem or context 'A' is identified. The components are identified and defined in structural 205, functional 210, operational 215, and/or conceptual 220 terms, as set forth in the context definition meta-structure 200 of FIG. 2.

Examples of language elements used in association with the structural, functional, operational, and conceptual terms are shown in FIG. 2. The context definition meta-structure 200 of FIG. 2 can include, but is not limited to, the words and language elements set forth in FIG. 2.

Components can include, for example, parts being assembled in a manufacturing line, equipment or tools used to facilitate the assembly of the components, or employees with specific roles and responsibilities for the given context. The identification of the components can be implemented in various ways, such as by arbitrarily defining components and then observing the context with and without the participation of the defined components. A shift in the outcome and functioning of context will confirm or refute the definition of components. Another way is to consult an expert with domain knowledge of the context and take his or her definition of components as a starting point.

After PROCESS 1, the flow proceeds to CHECK 1 in which a determination is made whether an optimum list of components has been identified or obtained. The list can be considered 'optimum' when all identified components in PROCESS 1 account for or otherwise match with all structural, functional, operational, and/or conceptual aspects of INPUT 1 and/or DATA SET 1. Examples of such structural 205, functional 210, operational 215, and/or conceptual 220 aspects are set forth in the context definition meta-structure 200 of FIG. 2. Alternatively, the list can be considered 'optimum' when the outcome of the context is not deemed dependent on any other obvious components for the current iteration.

The DATA SET 1 can include, for example, a current assessment level or statement of structural, functional, operational, and/or conceptual aspects of the ecosystem or context 'A', and the components associated therewith, on a measurable scale. For example, DATA SET 1 can include data that represents performance and success metrics for a given context such as productivity, throughput, cost, profits, etc. The DATA SET 1 can include or otherwise be defined by one or more of the structural 205, functional 210, operational 215, and/or conceptual 220 terms of the context definition meta-structure 200 of FIG. 2. Moreover, the INPUT 1 can include or otherwise be defined by one or more of the structural 205, functional 210, operational 215, and/or conceptual 220 terms of the context definition meta-structure 200 of FIG. 2.

If the result of CHECK 1 is NO, the flow returns to PROCESS 1 for further processing as set forth above. Otherwise, if YES, the flow proceeds to PROCESS 2, which includes a current component engagement quantification process. In PROCESS 2, the level of disengagement or engagement, for each component identified in PROCESS 1, is identified in terms of disengagement mechanisms 305 and engagement processes 310 and their respective structural, functional, operational, and/or conceptual terms as set forth in FIGS. 3A and 3B.

A disengagement and engagement quantification meta-structure, such as 300 illustrated in FIGS. 3A and 3B, is a map of disengagement mechanisms and engagement processes organized in structural, functional, operational, and/or conceptual terms. Disengagement mechanisms can include, for example, a passive identity mechanism 315, a defensive identity mechanism 320, a reactive identity mechanism 325, and/or an overactive identity mechanism 330. Engagement processes can include, for example, a contributing identity process 335, an engaged identity process 340, a relevant identity process 345, and a curious identity process 350.

Examples of language elements used in association with each disengagement mechanism 305 or engagement process 310 are shown in FIGS. 3A and 3B. The disengagement and engagement quantification meta-structure 300 can include, but is not limited to, the words and language elements set forth in FIGS. 3A and 3B.

As used herein, the term 'disengagement' refers to structure and/or function and/or operation of a component being counterproductive to the desired outcome of the context and the term 'engagement' refers to structure and/or function and/or operation of a component being aligned to the desired outcome of the context. In other words, the desired outcome of a component that supports the desired outcome of the context is determined, and then the structure, function and/or operation of the component are adjusted until the outcome of the component supports the desired outcome of the context.

A determination is then made at CHECK 2 whether the current component engagement quantification process is complete, and if NO, the flow returns to PROCESS 2 for further processing as set forth above. More specifically, CHECK 2 is completed by checking if all quantified components in PROCESS 2 account for or otherwise match with all structural, functional, operational, and/or conceptual aspects of DATA SET 1.

If the result of CHECK 2 is YES, the flow proceeds to PROCESS 3 in which one or more gaps between a current component engagement level and a potential component engagement level is measured and analyzed in a current to potential engagement level gap analysis process. The gap between the current and potential level of engagement, for each component identified in PROCESS 1, is quantified in terms of the disengagement mechanisms 305 and engagement processes 310 and their respective structural, functional, operational, and/or conceptual terms as set forth in the disengagement and engagement quantification meta-structure 300 of FIGS. 3A and 3B.

In other words, the current to potential engagement level gap analysis of PROCESS 3 can individually measure and analyze gaps between the current component engagement level for each component identified in PROCESS 1, and the potential engagement level for each component identified in PROCESS 1. The engagement level, whether current or potential, can be determined based on the disengagement mechanisms 305 and engagement processes 310 and their respective structural, functional, operational, and/or conceptual terms.

The current engagement level can use different structural, functional, operational, and/or conception terms from the potential engagement level. The gaps between the current and potential engagement levels can be measured by comparing the terms used in the disengagement mechanisms 305 and/or engagement processes 310 for the current engagement level with the terms used in the disengagement mechanisms 305 and/or engagement processes 310 for the potential engagement level. Measuring the one or more gaps can include comparing the current component engagement level with the potential component engagement level. The current component engagement level can be based on the level of disengagement and/or the level of engagement for each of the identified components. Similarly, the potential component engagement level can be based on the potential level of disengagement and/or the potential level of engagement for each of the identified components.

After PROCESS 3, the flow proceeds to CHECK 3, and a determination is made whether the gaps between the current and potential engagement levels have been identified and quantified. In addition, CHECK 3 can check if all quantified gaps in PROCESS 3 account for all structural, functional, operational, and/or conceptual aspects of the gap between DATA SET 1 and DATA SET 2.

The DATA SET 2 can include, for example, a potential assessment level or statement of structural, functional, operational, and/or conceptual aspects of an ecosystem or context, and the components associated therewith, on a measurable scale. For example, DATA SET 2 can include data that represents targets for performance and success metrics for a given context such as productivity, throughput, cost, profits, etc. The DATA SET 2 can include or otherwise be defined by one or more of the structural 205, functional 210, operational 215, and/or conceptual 220 terms of the context definition meta-structure 200 of FIG. 2.

If the result of CHECK 3 is NO, the process returns to PROCESS 3 for further processing as set forth above. If YES, the flow proceeds to PROCESS 4 in which a component interface transformation process is performed. In the component interface transformation process of PROCESS 4, the interface between components identified in PROCESS 1, is redefined as a process of movement of the relationships between components identified in PROCESS 1 in terms of their current and potential location on the component interface definition meta-structure map 400 set forth in FIG. 4.

For example, if an employee does not care or appreciate the purpose of the job, then the relationship with his or her manager will be that of ignoring and being ignored. In order to move towards engagement, that relationship can move from that of ignoring and being ignored (e.g., 405) to appreciation (e.g., 410) and acknowledgement (e.g., 415), then to attachment (e.g., 420) and belonging (e.g., 425), then to drive (e.g., 430) and connection (e.g., 435), and then to identification (e.g., 440) and validation (e.g., 445) for full engagement.

It will be understood that the movement between current and potential location on the component interface definition meta-structure map 400 can take any other path through the component interface definitions 460 set forth in the component interface definition meta-structure map 400 of FIG. 4, including a path through a neutral stage (e.g., 455) and/or transitional stages (e.g., 465). It will also be understood that the interface between components identified in PROCESS 1, can be redefined as a process of movement of the relationships between components identified in PROCESS 1 in terms of their current and potential location among the component interface definitions 450 set forth in the component interface definition meta-structure map 400 of FIG. 4.

After PROCESS 4, a determination is made at CHECK 4 whether the component interface transformation process is complete. More specifically, CHECK 4 can be completed by checking if the movement of the relationships between components identified in PROCESS 1 from their current to potential locations on the component interface definition meta-structure map 400 of FIG. 4 accounts for covering the gaps quantified in PROCESS 3. In other words, the movement of the one or more identified components on the component interface definition meta-structure map can resolve or otherwise fill the one or more gaps.

If result of CHECK 4 is YES, the flow proceeds to PROCESS 5. Otherwise, if NO, the flow returns to PROCESS 4 for further processing as set forth above. During PROCESS 5, the interface between the components can be restructured. In other words, the interface among components identified in PROCESS 1 is restructured in terms of progressive movement along various points on the component interface definition meta-structure map 400 of FIG. 4. For example, a communication protocol may be established to guide an employee or team of employees to move from appreciation (e.g., 410) and acknowledgement (e.g., 415), to attachment (e.g., 420) and belonging (e.g., 425), then to drive (e.g., 430) and connection (e.g., 435), and then to identification (e.g., 440) and validation (e.g., 445) as the job progresses.

After PROCESS 5, a determination is made at CHECK 5 whether the component interface restructuring process is complete. More specifically, CHECK 5 can be completed by checking if the structure of the relationships is congruent with the component interface definition meta-structure map 400 of FIG. 4, and accounts for covering the gaps quantified in PROCESS 3.

If the result of CHECK 5 is NO, the flow returns to PROCESS 5 for further processing as set forth above. Otherwise, if YES, the flow proceeds to OUTPUT 1 in which a new ecosystem or context 'B' is output either as a physical report (e.g., paper printout) or a computerized transmission of information to one or more data consumers. The new ecosystem or context 'B' corresponds to a restructured ecosystem or restructured context 'A', and can be defined in structural 205, functional 210, operational 215, and/or conceptual 220 terms as set forth in FIG. 2.

For example, the one or more identified components in the defined ecosystem or context 'A' can be restructured into an ecosystem or context 'B'. The restructuring can include mapping the movement of the one or more components from a current location to a potential location on a component interface definition meta-structure map such as map 400, and determining whether the mapped movement of the one or more identified components on the component interface definition meta-structure map resolves the one or more gaps. After determining that the mapped movement of the one or more identified components resolves the one or more gaps, a report can be output. The report or computerized transmission can include the organizational structure of the one or more components within the ecosystem or context 'B', the path along which the one or more components can be moved on the component interface definition meta-structure map 400 to resolve the one or more gaps, and other suitable information for facilitating movement or change within the current ecosystem or context.

In the restructured context associated with OUTPUT 1, the components identified in PROCESS 1 are equipped with the ability to move the relationship between and among the components on various locations of the component interface definition meta-structure map 400 as set forth in FIG. 4. Moreover, OUTPUT 1 can be defined in terms of the context and component definition meta-structure map 400 of FIG. 4.

The flow then proceeds to PROCESS 6 in which a follow-up engagement level quantification process is performed. More specifically, PROCESS 6 is used to validate OUTPUT 1 against DATA SET 2. For example, if the context 'A' was a product development group with certain success metrics, then context 'B' would be the same group with a clear awareness of the relationships along with better performance on their success metrics.

A determination is made at CHECK 6 whether an improved potential is achieved. In other words, if the current component engagement level has increased to the level of the potential component engagement level, or a threshold level has been met or surpassed, then the processing flow is complete and it ends. The threshold level can correspond to at least a fulfillment of the potential component engagement level. Otherwise, if the improved potential is not achieved, the flow returns to the PROCESS 1 stage and recursively repeats PROCESSES 1 through 6 until the improved potential is achieved or the threshold level has been met or surpassed.

One or more data sets, such as DATA SET 1 or DATA SET 2 can be used in association with various stages of the processing flow. For example, as shown in FIG. 1, DATA SET 1 can provide information to the CHECK 1 and/or CHECK 2 stages. The DATA SET 1 can include, for example, a current assessment level or statement of structural, functional, operational, and/or conceptual aspects of the ecosystem or context, and the components associated therewith, on a measurable scale. For example, DATA SET 1 can include data that represents performance and success metrics for a given context like productivity, throughput, cost, profits, etc.

Moreover, DATA SET 2 can provide information to the PROCESS 3, CHECK 3, PROCESS 4, CHECK 4, PROCESS 5, CHECK 5, PROCESS 6, and/or CHECK 6 stages. The DATA SET 2 can include, for example, a potential assessment level or statement of structural, functional, operational, and/or conceptual aspects of an ecosystem or context, and the components associated therewith, on a measurable scale. For example, DATA SET 2 can include data that represents targets for performance and success metrics for a given context like productivity, throughput, cost, profits, etc.

Figure 5:
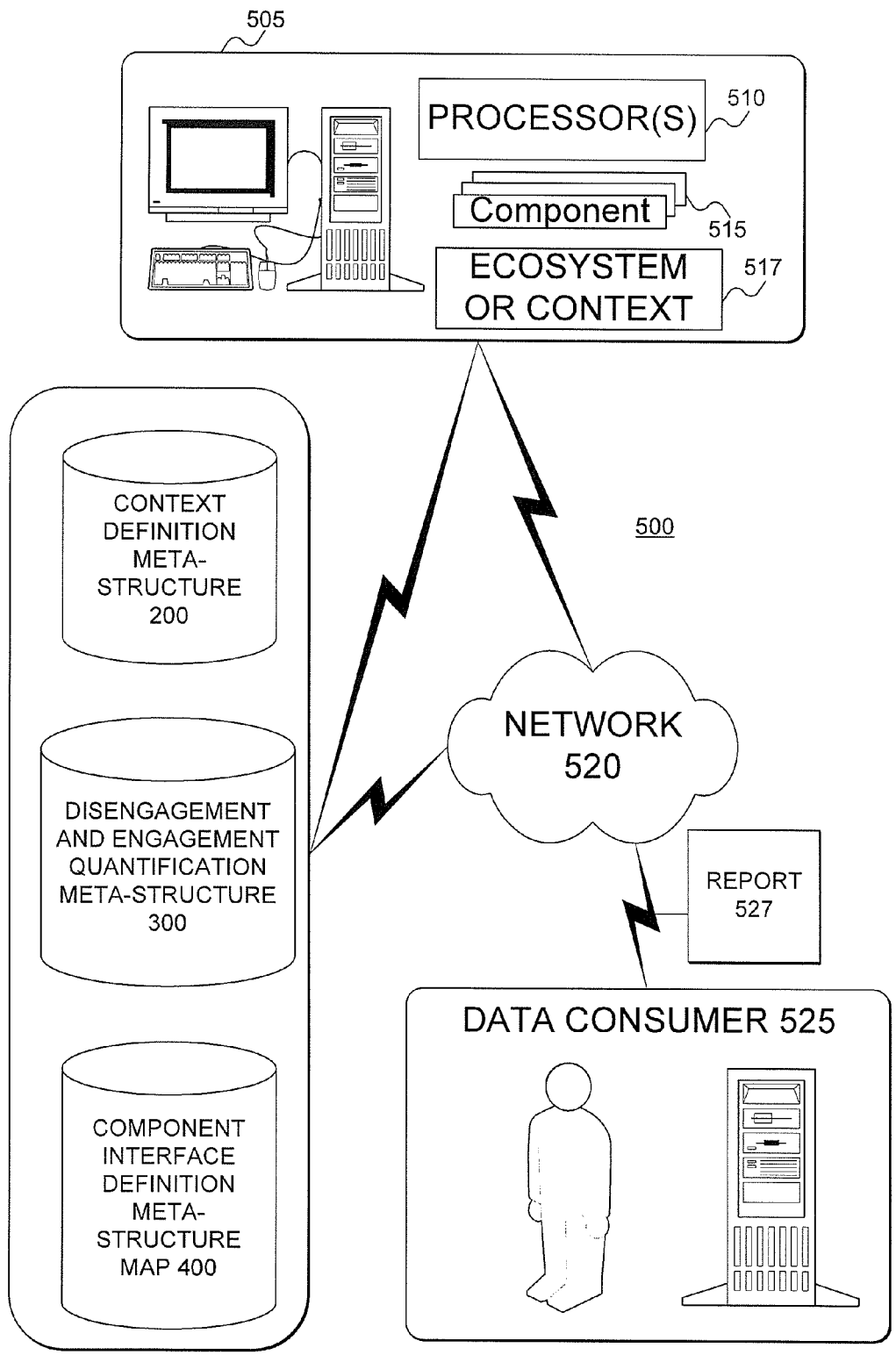
FIG. 5 is a block diagram illustrating a hardware system structured to implement one or more inventive aspects disclosed herein.

FIG. 5 is a block diagram illustrating a hardware system 500 including one or more inventive aspects disclosed herein. System 500 can include, for example, a computer server 505 having one or more processors 510 to identify, quantify, analyze, and/or optimize the level of engagement of one or more components 515 within a defined ecosystem or context 517. The components 515 can correspond to, or otherwise represent, for example, the components discussed in detail as set forth above. Similarly, the defined ecosystem or context 517 can correspond to, or otherwise represent, for example, the defined ecosystems and/or contexts discussed in detail as set forth above. Server 505 can be directly coupled to one or more computer databases or tables, which can include the context definition meta-structure 200, the disengagement and engagement quantification meta-structure 300, and/or the component interface definition meta-structure map 400. Alternatively, the server 505 can access such databases or tables over network 520.

One or more data consumers 525, which can include one or more computers or one or more individual persons, can receive information from server 505 over network 520. Such received information can include one or more statements or reports 527 indicating the level of engagement of the components 515 within the defined ecosystem or context 517. The one or more reports 527 can correspond to, for example, the physical or electronic report discussed above. Such statements or reports 527 can be produced using any of the methods described above with reference to FIGS. 1-4.

It will be understood that the one or more statements or reports 527 can include an electronic statement or report that is storable in a storage medium such as a hard disk drive, memory, or other suitable storage device. Alternatively, the one or more statements or reports 527 can include a physical statement or report such as a paper printout, which may be derived from the electronic statement or report.

In addition, computer server 505 can process or otherwise perform the techniques described above with reference to FIGS. 1-4 using the processor 510 in association with the components 515, the defined ecosystem or context 517, and interacting with databases or tables 200, 300, and/or 400.

Rather than focus on total output of an environment—such as an assembly or manufacturing line—the inventive principles disclosed herein are directed to the engagement of components in coherence with the output, and the relationships between and among the components themselves.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Other similar or non-similar modifications can be made without deviating from the intended scope of the invention. Accordingly, the invention is not limited except as by the appended claims.

What is claimed is:

1. A computer-implemented method for optimizing the level of engagement of components within a defined ecosystem or context, the method comprising:

defining an initial ecosystem or context 'A' in structural, functional, operational, and conceptual terms in a computer;

identifying one or more components in the defined ecosystem or context 'A';

determining whether all identified components account for all of the structural, functional, operational, and conceptual terms of the initial ecosystem or context 'A';

quantifying at least one of a level of disengagement and a level of engagement for each of the identified components in the computer;

determining whether the quantifying of the at least one of the level of disengagement and the level of engagement is complete;

for each of the identified components, measuring one or more gaps between a current component engagement level and a potential component engagement level in the computer; and outputting a report associated with the one or more identified components and the one or more measured gaps between the current component engagement level and the potential component engagement level.

2. The method of claim 1, wherein measuring the one or more gaps includes comparing the current component engagement level with the potential component engagement level.

3. The method of claim 2, wherein the current component engagement level is based at least on the level of disengagement and the level of engagement for each of the identified components.

4. The method of claim 2, wherein the potential component engagement level is based at least on the potential level of disengagement and the potential level of engagement for each of the identified components.

5. The method of claim 1, wherein determining whether all identified components account for all of the structural, functional, operational, and conceptual terms includes determining whether the identified components account for all of the structural, functional, operational, and conceptual terms of a first data set.

6. The method of claim 5, wherein the first data set includes a current assessment level of structural, functional, operational, and conceptual aspects of the ecosystem or context 'A'.

7. The method of claim 5, further comprising determining whether the one or more measured gaps account for all of the structural, functional, operational, and conceptual aspects of a gap between the first data set and a second data set.

8. The method of claim 7, wherein the second data set includes a potential assessment level of structural, functional, operational, and conceptual aspects of the ecosystem or context 'A'.

9. The method of claim 1, further comprising:

moving the one or more identified components from a current location to a potential location on a component interface definition meta-structure map.

10. The method of claim 9, wherein the component interface definition meta-structure map includes locations corresponding to at least ignored, appreciation, acknowledgement, attachment, belonging, drive, connection, identification, and validation.

11. The method of claim 10, further comprising determining whether the movement of the one or more identified components on the component interface definition meta-structure map resolves the one or more gaps.

12. The method of claim 1, further comprising:

restructuring the one or more identified components in the defined ecosystem or context 'A' into a new ecosystem or context 'B'.

13. The method of claim 12, wherein restructuring includes:
   mapping the movement of the one or more components from a current location to a potential location on a component interface definition meta-structure map; and
   determining whether the mapped movement of the one or more identified components on the component interface definition meta-structure map resolves the one or more gaps.

14. The method of claim 13, wherein:
   after it is determined that the mapped movement of the one or more identified components resolves the one or more gaps, outputting the report; and
   the report includes an organizational structure of the one or more components within the new ecosystem or context 'B'.

15. The method of claim 14, further comprising determining whether a threshold level of potential component engagement level has been achieved.

16. One or more tangible computer-readable media storing non-transitory computer-executable instructions that, when executed by a processor, result in:
   defining an initial ecosystem or context 'A' in structural, functional, operational, and conceptual terms;
   identifying one or more components in the defined ecosystem or context 'A';
   determining whether all identified components account for all of the structural, functional, operational, and conceptual terms of the initial ecosystem or context 'A';
   quantifying at least one of a level of disengagement and a level of engagement for each of the identified components;
   determining whether the quantifying of the at least one of the level of disengagement and the level of engagement is complete;
   for each of the identified components, measuring one or more gaps between a current component engagement level and a potential component engagement level; and
   outputting a report associated with the one or more identified components and the one or more measured gaps between the current component engagement level and the potential component engagement level.

17. The computer-readable media of claim 16, wherein measuring the one or more gaps includes comparing the current component engagement level with the potential component engagement level.

18. The computer-readable media of claim 17, wherein the current component engagement level is based at least on the level of disengagement and the level of engagement for each of the identified components.

19. The computer-readable media of claim 17, wherein the potential component engagement level is based at least on the potential level of disengagement and the potential level of engagement for each of the identified components.

20. The computer-readable media of claim 16, wherein determining whether all identified components account for all of the structural, functional, operational, and conceptual terms includes determining whether the identified components account for all of the structural, functional, operational, and conceptual terms of a first data set.

21. The computer-readable media of claim 20, wherein the first data set includes a current assessment level of structural, functional, operational, and conceptual aspects of the ecosystem or context 'A'.

22. The computer-readable media of claim 20, further comprising determining whether the one or more measured gaps account for all of the structural, functional, operational, and conceptual aspects of a gap between the first data set and a second data set.

23. The computer-readable media of claim 22, wherein the second data set includes a potential assessment level of structural, functional, operational, and conceptual aspects of the ecosystem or context 'A'.

24. The computer-readable media of claim 16, further comprising:
   moving the one or more identified components from a current location to a potential location on a component interface definition meta-structure map.

25. The computer-readable media of claim 24, wherein the component interface definition meta-structure map includes locations corresponding to at least ignored, appreciation, acknowledgement, attachment, belonging, drive, connection, identification, and validation.

26. The computer-readable media of claim 25, further comprising determining whether the movement of the one or more identified components on the component interface definition meta-structure map resolves the one or more gaps.

27. The computer-readable media of claim 16, further comprising:
   restructuring the one or more identified components in the defined ecosystem or context 'A' into a new ecosystem or context 'B'.

28. The computer-readable media of claim 27, wherein restructuring includes:
   mapping the movement of the one or more components from a current location to a potential location on a component interface definition meta-structure map; and
   determining whether the mapped movement of the one or more identified components on the component interface definition meta-structure map resolves the one or more gaps.

29. The computer-readable media of claim 28, wherein:
   after it is determined that the mapped movement of the one or more identified components resolves the one or more gaps, outputting the report; and
   the report includes an organizational structure of the one or more components within the new ecosystem or context 'B'.

30. The computer-readable media of claim 29, further comprising determining whether a threshold level of potential component engagement level has been achieved.

31. A system for optimizing the level of engagement of components within a defined ecosystem or context, the system comprising:
   a computer having one or more processors to identify and optimize the level of engagement of one or more components within a defined ecosystem or context;
   a context definition meta-structure including structural, functional, operational, and conceptual terms;
   a disengagement and engagement quantification meta-structure including a map of disengagement mechanisms and engagement processes; and
   a component interface definition meta-structure map including one or more paths for moving the one or more components from current locations to potential locations,
   wherein the one or more processors are configured to identify and optimize the level of engagement of the one or more components using the context definition meta-structure, the disengagement and engagement quantification meta-structure, and the component interface definition meta-structure map.

32. The system of claim 31, wherein the one or more processors of the computer are configured to:
- define an initial ecosystem or context 'A' in structural, functional, operational, and conceptual terms using the context definition meta-structure;
- identify the one or more components in the defined ecosystem or context 'A';
- determine whether all identified components account for all of the structural, functional, operational, and conceptual terms of the initial ecosystem or context 'A';
- quantify at least one of a level of disengagement and a level of engagement for each of the identified components using the disengagement and engagement quantification meta-structure;
- for each of the identified components, measure one or more gaps between a current component engagement level and a potential component engagement level; and
- output a report associated with the one or more identified components and the one or more measured gaps between the current component engagement level and the potential component engagement level.

33. The system of claim 32, wherein the one or more processors of the computer are configured to:
- restructure the one or more identified components in the defined ecosystem or context 'A' into an ecosystem or context 'B' using the component interface definition meta-structure map;
- map the movement of the one or more components from a current location to a potential location on the component interface definition meta-structure map; and
- determine whether the mapped movement of the one or more identified components on the component interface definition meta-structure map resolves the one or more gaps.

34. The system of claim 33, further comprising a network and a data consumer, wherein the one or more processors of the computer are configured to:
- output the report over the network to the data consumer, wherein the report includes an organizational structure of the one or more components within the ecosystem or context 'B'.

* * * * *